(12) United States Patent
Kohno et al.

(10) Patent No.: US 6,245,455 B1
(45) Date of Patent: Jun. 12, 2001

(54) SODIUM-SULFUR SECONDARY BATTERY

(75) Inventors: Kazushige Kohno; Seizi Koike, both of Hitachi; Toshiya Doi, Hitachioota; Tomoichi Kamo, Ibaraki; Masaru Kadoshima; Kozo Sakamoto, both of Hitachi; Shigeoki Nishimura, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/110,162

(22) Filed: Jul. 6, 1998

(30) Foreign Application Priority Data

Jul. 4, 1997 (JP) .................................................. 9-179302
May 7, 1998 (JP) .................................................. 10-124746

(51) Int. Cl.[7] ....................................................... H01M 4/36
(52) U.S. Cl. ........................... 429/101; 429/235; 429/238
(58) Field of Search .................................... 429/101, 235, 429/238

(56) References Cited

U.S. PATENT DOCUMENTS

| 4,309,817 | * | 1/1982 | Goebel et al. | 29/623.1 |
| 4,347,293 | * | 8/1982 | Goebel et al. | 429/105 |
| 5,800,941 | * | 9/1998 | Elster et al. | 429/105 |

FOREIGN PATENT DOCUMENTS

| 0 118 657 | * | 1/1984 | (EP) | 429/101 |
| 54-109134 | * | 8/1979 | (JP) . | |

* cited by examiner

*Primary Examiner*—Laura Weiner
(74) *Attorney, Agent, or Firm*—Antonelli, Terry, Stout & Kraus, LLP

(57) ABSTRACT

A sodium-sulfur battery in which sulfur and/or sodium polysulfide are used as cathode active materials, and an electronic conductor, which are arranged in a cathode chamber between a cathode container operating concurrently as a cathode electric collector and a solid electrolyte tube, and a layer, made of a material having a superior corrosion resistance against sulfur and sodium polysulfide, is provided between said solid electrolyte tube and said electronic conductor, wherein the cathode electric collector as the electronic conductor has been improved.

21 Claims, 6 Drawing Sheets

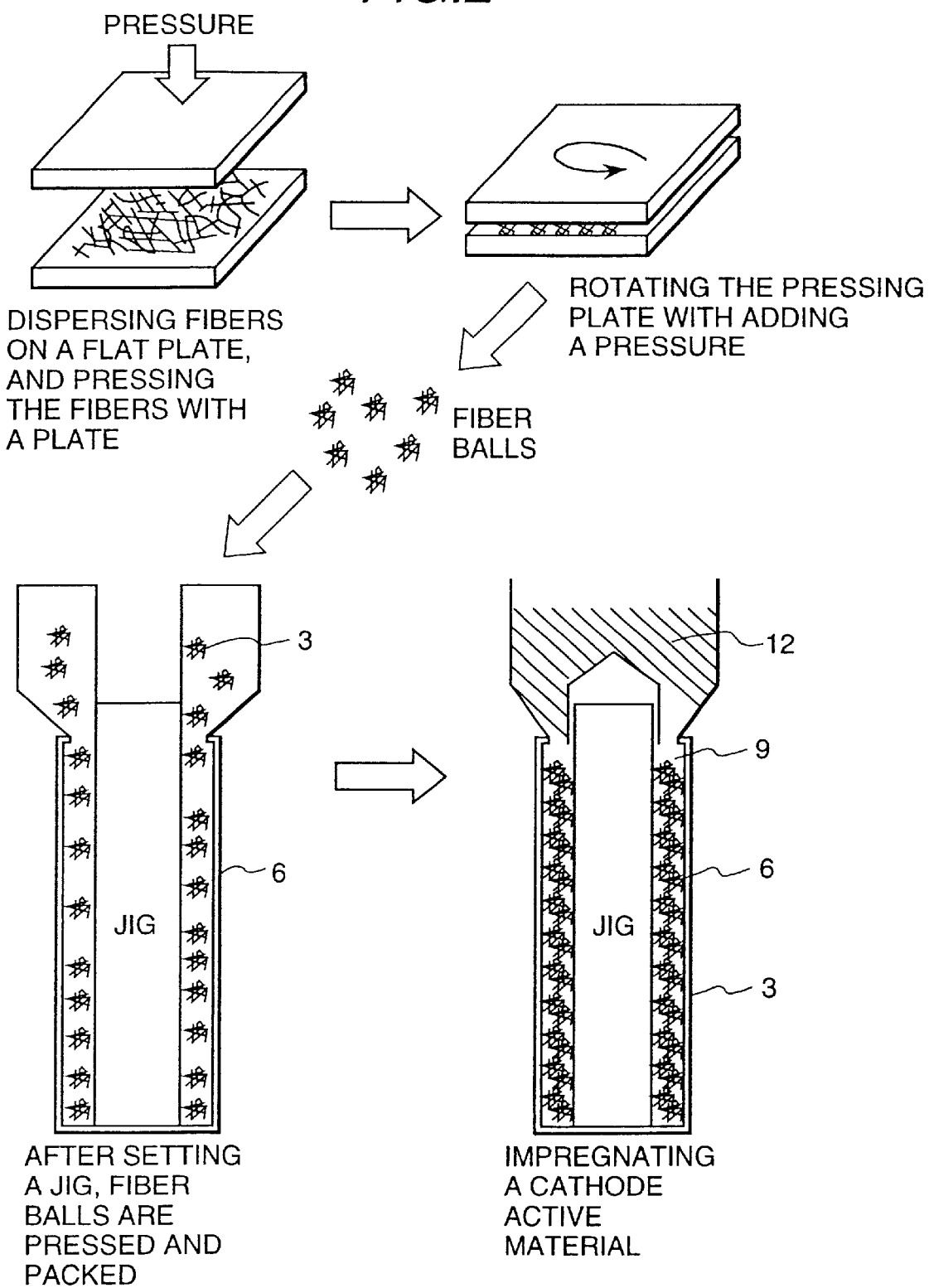

FIG.5
(a)
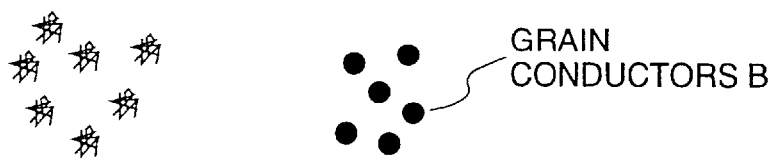
GRAIN CONDUCTORS B
MIXED MATERIAL
C = (A + B)
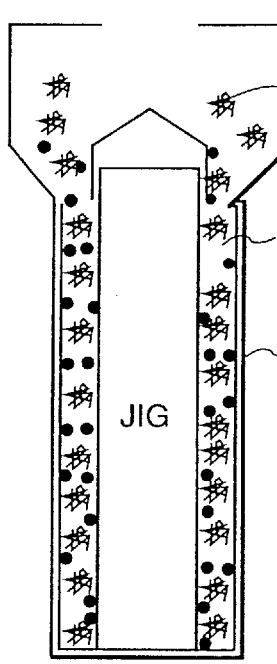
(b) AFTER SETTING A JIG, PRESSING AND PACKING THE MIXED MATERIAL
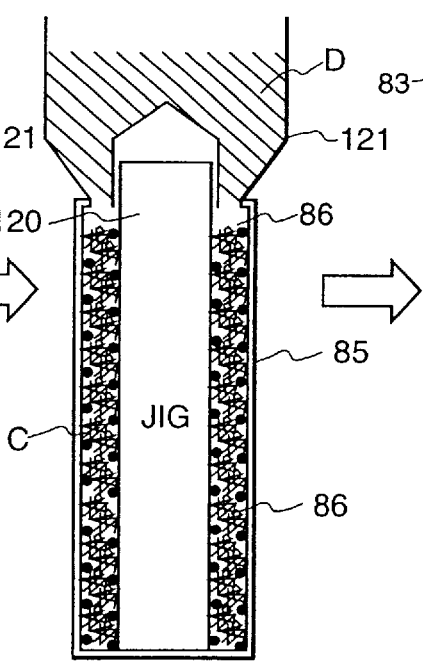
(c) IMPREGNATING A CATHODE ACTIVE MATERIAL
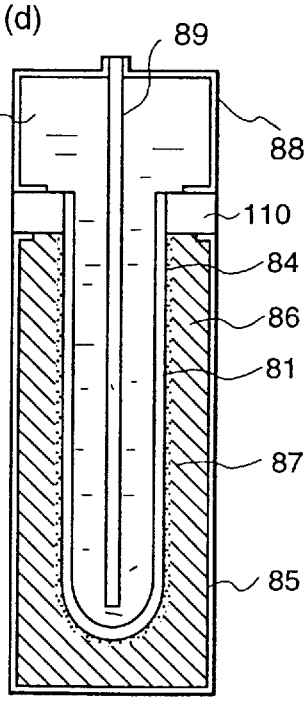
(d) CONNECTING BY THERMOCOMPRESSION TO ASSEMBLY A BATTERY

SODIUM-SULFUR SECONDARY BATTERY

BACKGROUND OF THE INVENTION

The present invention relates to a sodium-sulfur secondary battery, and more particularly, to the structure of a cathode chamber of a sodium-sulfur battery having superior charge-discharge cycle characteristics and a simple structure, and a method of manufacturing the same.

The sodium-sulfur secondary battery is one of the sealed type secondary batteries which uses a solid electrolyte tube having a sodium ion conductivity comprising at least either one of β-alumina and β"-alumina as an electrolyte, and which separates sodium as an anode active material from at least either one of sulfur and sodium polysulfide as a cathode active material, at least one of which is contained in a battery vessel. Such a battery is capable of being operated at a temperature in the range of 300° C.–350° C. In the present application, and as can be seen in the foregoing, a cathode is defined as an electrode filled with sulfur and/or sodium polysulfide, and an anode is defined as an electrode filled with sodium.

Regarding a sodium-sulfur battery, a technique to place a conductive felt-like carbon mat (rug) material, i.e. an electronic conductor, between the solid electrolyte tube and the cathode vessel, in order to collect electricity of the battery and to maintain the sulfur and sodium polysulfide, i.e. cathode active materials, has been disclosed, for example, in JP-A-6-283201 (1994), and JP-A-7-122294 (1995).

The carbon mat material used in the above mentioned battery was manufactured by perforating needle punches to a web made of flame resistant carbon fiber and calcining the web. However, this technique had problems in that the number of manufacturing steps was large, and the production cost of the mat itself was high, because plural carbon mat materials which had been fabricated in the shape of circular arc needed to be contained in the cathode chamber.

The electronic conductor made of carbon mat material operated as an electric collector between the solid electrolyte tube and the cathode container. Therefore, the contact resistance of the carbon mat material with the solid electrolyte tube was decreased by installing the mat into the cathode chamber in a compressed condition. However, if the compressing force applied to the mat was not uniform, local tensile stresses were generated on the surface of the solid electrolyte tube, and a danger of possible breakage of the solid electrolyte tube could be anticipated after a long period of operation of the battery. Furthermore, when the mat was compressed, a fluctuation in the fiber density was readily generated, and consequently, another problem arose in the form of a fluctuation in the internal resistance of the battery.

In accordance with JP-A-54-109134 (1979), a technique to provide a cathode collector by piling up short carbon fibers and bonding them with a carbide was disclosed. However, the technique had a problem in that the number of steps of the manufacturing process could not be decreased, because a step for piling up short fibers and a step for carbonizing the binder were necessary. Furthermore, fluctuation in electronic conductivity of the binder occurred depending on the carbonizing condition of the binder, and consequently, a problem in which a incrementing of the internal resistance was generated.

JP-A-57-27572 (1982) disclosed a technique to use swelled graphite of 2–50% by weight as a cathode collector. The swelled graphite is graphite which has swelled in a direction of the c-axis among crystalline axes of the graphite. However, in the case of the cathode electric collector disclosed in the above publication, the electricity collecting resistance became higher in comparison with a case when carbon fiber was used as the collector, and consequently, the charge-discharge efficiency was decreased. Several electric collectors have been disclosed in JP-A-61-156640 (1986) and U.S. Pat. No. 4,169,120, in addition to the above references.

SUMMARY OF THE INVENTION

One of the objects of the present invention is to provide a sodium-sulfur secondary battery having superior charge-discharge cycle characteristics, a cathode chamber having a structure which is not difficult to manufacture, and a method of manufacturing same.

One of the other objects of the present invention is to solve the above problems, and to provide a sodium-sulfur secondary battery having superior charge-discharge resistance characteristics and which is not difficult to manufacture.

One of the features of the present invention relates to a sodium-sulfur battery which has such a structure in which sulfur, and/or sodium polysulfide, and an electronic conductor can be arranged in a cathode chamber between a battery vessel, operating concurrently as a cathode electric collector, and a solid electrolyte tube, and wherein a material having a low electronic conductivity and superior corrosion resistance against sulfur and sodium polysulfide is arranged between the solid electrolyte tube and the electronic conductor; and this feature involves composing the electronic conductor of an assembly of a plural number of balls made of an electronic conducting substance having an elasticity and a porosity equal to or more than 80%.

By using the above assembly of a plural number of balls made of an electronic conductor (primary assembly balls) having an elasticity and a porosity equal to or more than 80%, uniform packing of the electronic conductor into the cathode chamber becomes possible.

Consequently, preferable charge-discharge cycle characteristics can be obtained, because a diffusion of the active material in the cathode chamber is not disturbed when the charge-discharge reaction progresses.

Furthermore, the danger of a significant breakage of the battery resulting on account of breakage of the solid electrolyte tube can be decreased, because a restriction force generated by coagulation of the cathode active material is reduced when the temperature of the battery is decreased, and any tensile stress generated at the surface of the electrolyte tube is small. By reducing the stress in the solid electrolyte tube, a reduction of the wall thickness of the electrolyte tube becomes possible, and the internal resistance of the battery can be reduced. Accordingly, a battery adequate for assembling a module, which is formed by connecting plural batteries in series, can be provided, because heat generation with a high current density operation is reduced. If the porosity of the electronic conductor ball is reduced to less than 80%, the packing ratio of the cathode active material is decreased, and the capacity of the battery is reduced. The porosity of the electronic conductor ball can be controlled by mixing powder of either the same material as the electronic conductor ball or an electronic conducting substance having a superior corrosion resistance against sulfur and/or sodium polysulfide. An uniform packing of the assembly of the balls into the cathode chamber is facilitated by mixing and using at least two kinds of balls having typical outer diameters different from each other.

Another one of features of the present invention relates to a sodium-sulfur secondary battery having a cathode active material and a cathode electric collector in the cathode chamber using a mixed material of conductive fiber balls having a porosity equal to or more than 80% and conductive grains as the cathode electric collector.

In this case, the grains size of the conductive grain in the range from 10 $\mu$m to 5000 $\mu$m can be used, and the conductive grains can be composed of a single material or a mixture of at least two kinds of materials, selected from the group consisting of carbon made from polyacrylonitrile, carbon made from coal-tar pitch, non-crystalline carbon, natural graphite, artificial graphite, acetylene black, kitchen black, Cr—Co base alloys, and Al—Si alloys.

Still another one of features of the present invention relates to a sodium-sulfur secondary battery having a cathode active material and a cathode electric collector in the cathode chamber using a mixed material of conductive fiber balls having a porosity equal to or more than 80% and conductive short fibers as the cathode electric collector.

In this case, the conductive short fibers can be composed of a single kind of fiber or a mixture of at least two kinds of fibers, selected from the group consisting of carbon made from polyacrylonitrile, carbon made from coal-tar pitch, and non-crystalline carbon fiber.

BRIEF DESCRIPTION OF THE DRAWINGS

FIG. 2 is a set of schematic illustrations representing a flow diagram indicating an example of a packing procedure for the cathode electric collector of the sodium-sulfur battery relating to an embodiment of the present invention, FIG. 5 is a set of schematic illustrations representing a flow diagram for the manufacturing steps of an embodiment of the sodium-sulfur secondary battery of the present invention.

DESCRIPTION OF THE PREFERRED EMBODIMENTS

Figure 1:
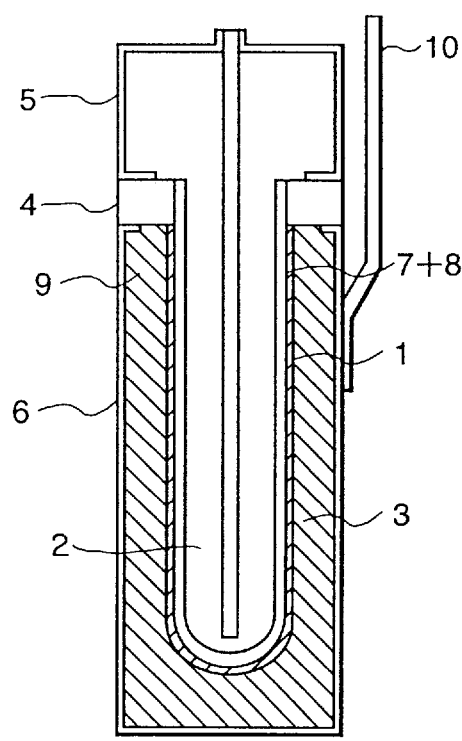
FIG. 1 is a vertical cross section of a sodium-sulfur battery relating to an embodiment of the present invention.

Hereinafter, the sodium-sulfur secondary battery of the present invention will be described in detail with reference to the preferred embodiments illustrated in the drawings. The embodiments indicated here are typical examples of the present invention, and the present invention is not restricted to these embodiments. Furthermore, the structure of the battery is not restricted to a cylindrical solid electrolyte tube having a bottom plate.

In accordance with FIG. 1, an insulating ring 4 is fixed at the upper end of the solid electrolyte tube 1, and an anode chamber 2, which is mainly filled with sodium, is formed in the tube 1. A cathode chamber 9 is mainly filled with a cathode active material 3 composed of sulfur and/or sodium polysulfide and an electronic conductor. A mixture 7 of a material having a low electronic conductivity and superior corrosion resistance against sulfur and/or sodium polysulfide consists of carbon and an oxide ceramics material (for instance, such as $Al_2O_3$, $ZrO_2$, $TiO_2$, and the like) adhered to the solid electrolyte tube 1 with an inorganic binder 8. An anode vessel 5 and a cathode vessel 6 are fixed to the insulating ring 4 by thermocompression bonding and are sealed. A terminal 10 is connected to the cathode vessel 6.
(Embodiment 1)

In accordance with a result of measuring tensile stresses applied to the surface of the solid electrolyte tube of the battery using the cathode electronic conductor of the present invention, it was confirmed that only a tensile stress of approximately less than 1 MPa at maximum was applied to the solid electrolyte tube. On the contrary, in accordance with a comparative example, wherein a carbon group mat was used as the cathode electronic conductor, it was confirmed that a tensile stress of approximately 30 MPa at maximum was generated.
(Embodiment 2)

An example of a procedure for compressing, pressurizing and packing the fiber assemblies is indicated in FIG. 2. First, the fiber is dispersed on a plate having a smooth plane. Then, tangled fiber balls are fabricated by compressing the fiber downward with a flat plate from the top, and sliding or rotating the flat plate onto the fiber. After packing an arbitrary amount of the fiber balls into the cathode chamber by compression, the cathode active material is impregnated. An arbitrary mount is desirably in the range of 5–40% of the volume of the cathode chamber. For the compressing and packing, a jig shaped like a funnel for charging, as indicated in FIG. 2, is set, and then, the fiber balls are compressed and packed.

In order to impregnate the cathode active material, a jig like a funnel can also be used in the same manner as the compressing and packing as indicated in FIG. 2.
(Embodiment 3)

Figure 3:
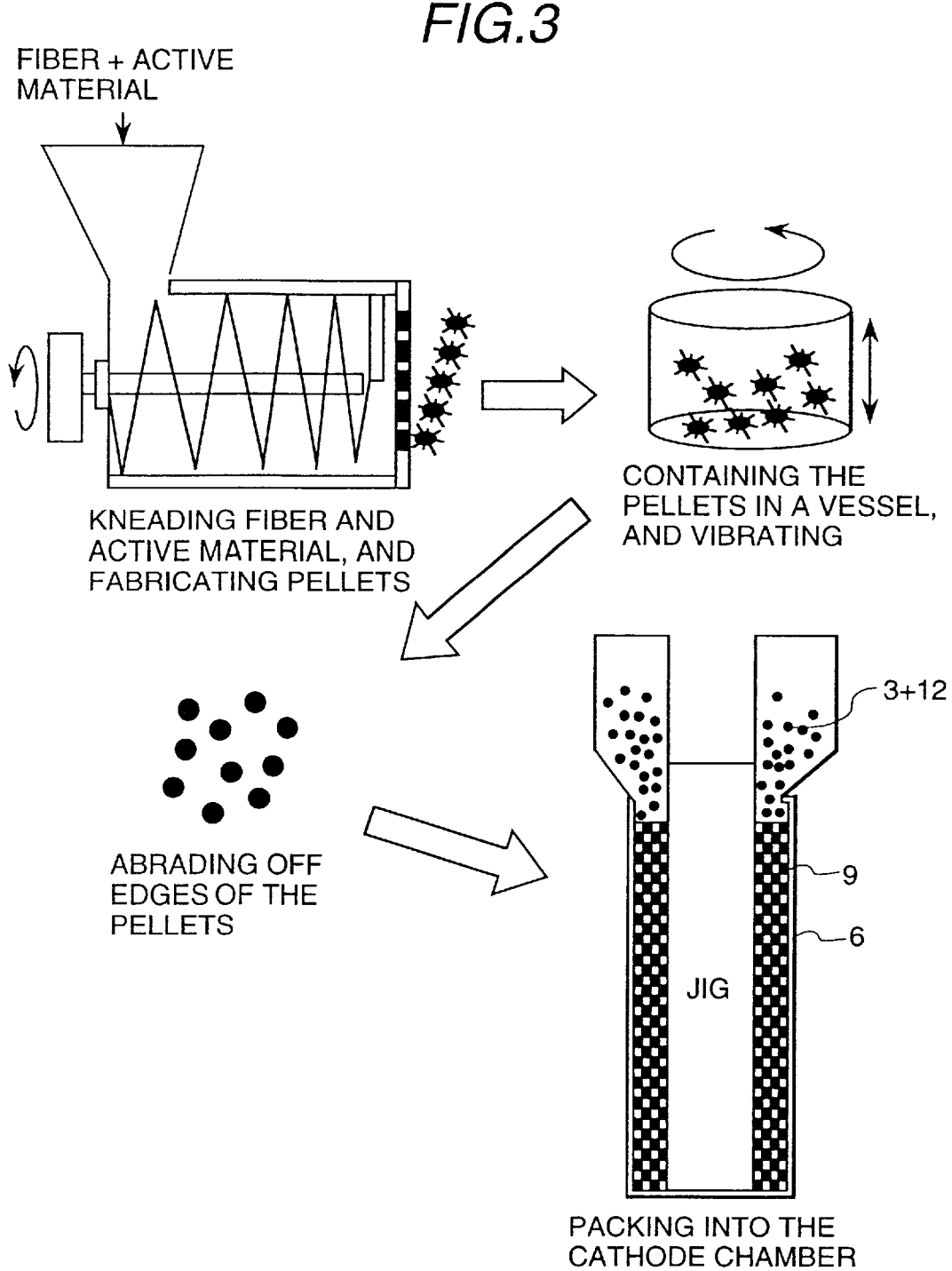
FIG. 3 is a set of schematic illustrations representing a flow diagram indicating another example of a packing procedure for the cathode electric collector of the sodium-sulfur battery relating to an embodiment of the present invention.

An example of a procedure for kneading, fabricating and packing the fiber is indicated in FIG. 3. First, the fiber is kneaded with the fused cathode active material to obtain a mixture. Then, the mixture is fabricated into the shape of pellets by extrusion using an extruder. The pellets are packed into the cathode chamber. When fabricating the pellets, a casting method can also be used. A step to effect vibration or stirring of the pellets in a vessel as indicated in FIG. 3 can be added. In accordance with the above step, the edge of the pellets can be abraded off, and the shape of the pellets thereby becomes close to that of spheres. Consequently, packing of the pellets into the cathode chamber can be facilitated. The outer diameter of the pellets can be controlled by controlling the size of the extruding nozzle of the extruder.
(Embodiment 4)

Figure 4:
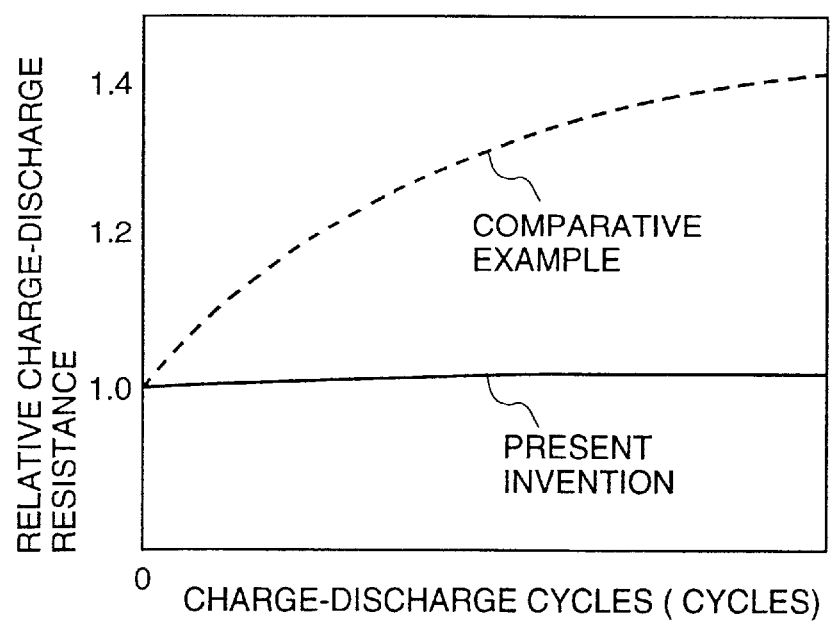
FIG. 4 is a graph indicating a cycle change of the charge-discharge resistance of the sodium-sulfur battery relating to an embodiment of the present invention.

A relationship between a relative charging resistance and charge-discharge cycles of the sodium-sulfur battery using the fiber balls of the present invention as a cathode electronic conductor is indicated in FIG. 4. The comparative example indicated concurrently in FIG. 4 is for a battery using a fiber mat as the cathode electronic conductor. The ordinate of FIG. 4 indicates values of charging resistance taking the charging resistance of the comparative example at the charge-discharge cycle zero as 1.

In accordance with FIG. 4, it was confirmed that a battery using the cathode electronic conductor (also called a cathode electric collector) prepared by the procedure of the present invention had a small increment in the relative charge-discharge resistance accompanied with the increment of the charge-discharge cycles.

In accordance with the above embodiments, uniform packing of the electronic conductor into the cathode chamber becomes possible by using an assembly of a plural number of balls made of an electronic conductor (balls assembly) having an elasticity and a porosity equal to or more than 80%. Consequently, preferable charge-discharge cycle characteristics can be obtained, because a diffusion of the active material in the cathode chamber is not disturbed when the charge-discharge reaction progresses. Furthermore, the danger of causing a significant breakage of the battery on account of breakage of the solid electrolyte tube can be decreased, because a restriction force generated by coagulation of the cathode active material, when the temperature of the battery is decreased, is reduced, and the tensile stress generated at the surface of the electrolyte tube is small.

By reducing the stress in the solid electrolyte tube, a reduction of the thickness of the electrolyte tube wall becomes possible, and the internal resistance of the battery can be reduced. Accordingly, a battery adequate for assembling a module, which is composed by connecting plural batteries in series, can be provided, because heat generation with a high current density operation is reduced.

Figure 8:
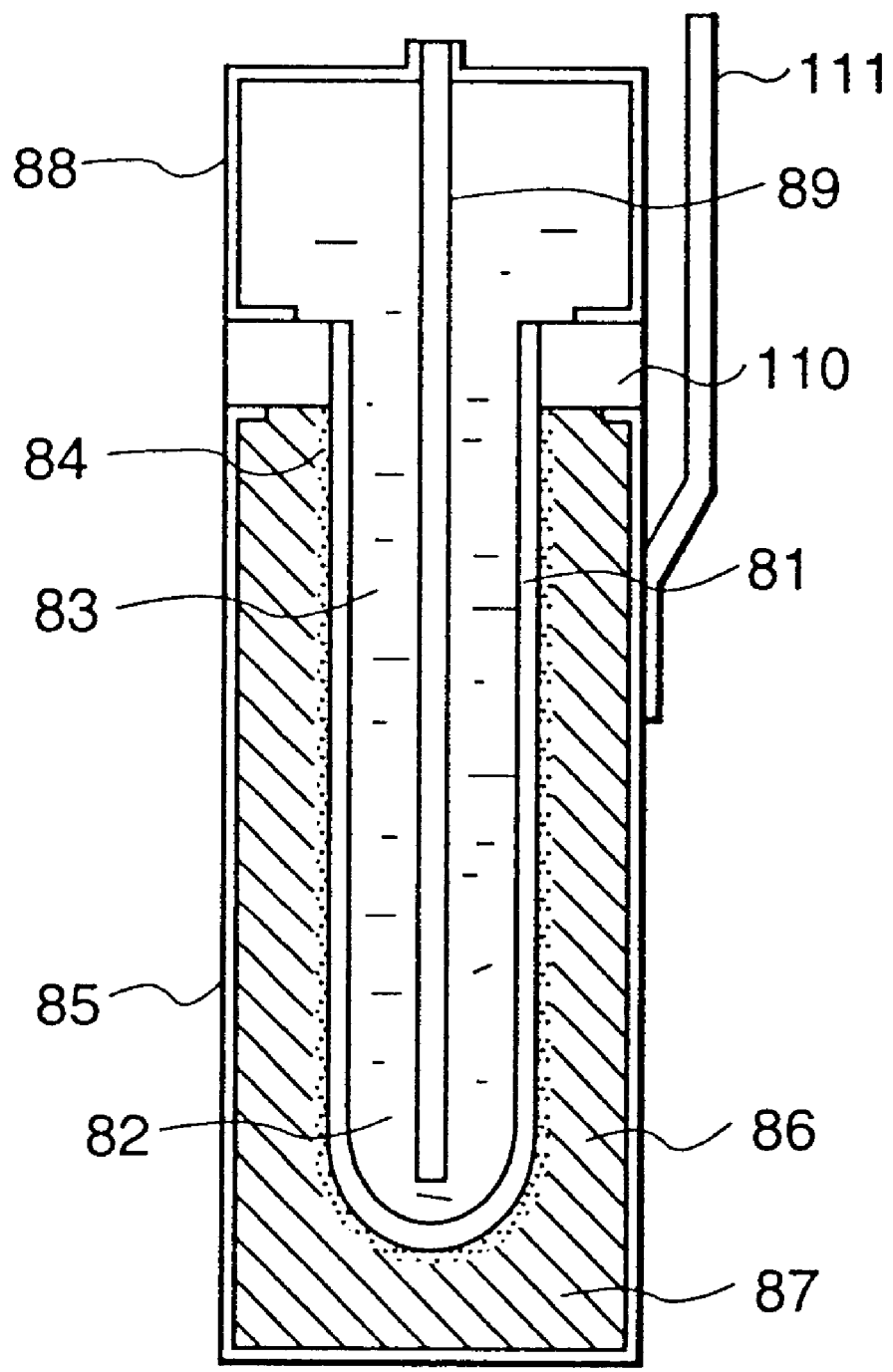
FIG. 8 is a cross section of an example of the sodium-sulfur secondary battery relating to the embodiment of the present invention.

In the following embodiments of the present invention, as explained hereinafter, the sodium-sulfur secondary battery indicated in FIG. 8 is taken as an example.

FIG. 8 is a schematic vertical cross section of an example of a general sodium-sulfur secondary battery, wherein the numeral 81 indicates a solid electrolyte tube made of material, such as β-alumina, or β"-alumina in the shape of a one-end closed tube to form an anode chamber 82 inside, and the anode active material 83, which is composed of mainly metallic sodium, is enclosed therein.

A high resistant layer 84, having a resistance higher by more than 10 times the resistance of the cathode electric collector, and a high corrosion resistance against sodium and/or sodium polysulfide, made of materials such as alumina and carbon, and the like, is provided at the outer periphery of the solid electrolyte tube 81.

The numeral 85 indicates a cathode container, which is formed in a cylindrical shape having a bottom at one end, made of a metallic material, such as stainless steel, for example; and a cathode terminal 111 is connected to the cathode container 85, and concurrently, operates to support the solid electrolyte tube 81 at the center of inside the tube, and to form the cathode chamber 86 around the solid electrolyte tube 81.

The cathode active material 87, comprising mainly at least either one of sulfur or sodium polysulfide, is enclosed in the cathode chamber 86.

The numeral 88 indicates an anode container, which is made of a metallic material such as stainless steel, and the like, operating to seal the anode chamber 82, and concurrently, to support a metallic electrode 89 inserted into the anode active material 83 in the solid electrolyte tube 81, and to compose an anode terminal of the battery.

The numeral 110 indicates an insulating ring made of ceramics, such as alumina and the like, which operates to bond the cathode container 85 and the anode container 88 by thermocompression bonding to seal the cathode chamber 86, and to separate the cathode from the anode.

In accordance with the above-described sodium-sulfur secondary battery, the cathode active material 87 is enclosed in the cathode chamber 86 in a condition in which a cathode electric collector comprising a conductive substance is provided in the cathode chamber 86, and sulfur and/or sodium polysulfide are impregnated therein.

In accordance with the following embodiment of the present invention, as indicated in FIG. 8, the composition of the cathode electric collector used as the cathode active material 87, which is mainly composed of sulfur and/or sodium polysulfide, is important.

The embodiments of the present invention explained hereinafter are only examples of the present invention. Accordingly, the present invention is not restricted to the composition of the battery indicated in FIG. 8, nor is it restricted to the shape of the battery, which uses a solid electrolyte tube in the shape of a cylinder with a bottom at one end (one-end closed tube), as indicated in FIG. 8. For instance, it is needless to say that the embodiment of the present invention can also use a battery shape having an electrode structure of a type having flat-plates in parallel.

(Embodiment 5)

FIG. 5 is a set of schematic illustrations for explanation of an embodiment of a sodium-sulfur secondary battery according to the present invention including the manufacturing steps thereof.

In accordance with the present embodiment, the previously prepared conductive fiber balls A and conductive grains B are weighed as indicated in FIG. 5 at step (a), and then, they are mixed with a predetermined mixing ratio to compose the mixed material C, which forms the cathode electric collector. Details of the conductive fiber ball A and conductive grain B are explained later, but the conductive fiber ball A relating to the embodiments 1–4 can be used.

Next, after holding the cathode container 85 of the battery in a vertically standing position, as indicated in FIG. 5 at step (b), the previously prepared jig 120 made of a cylindrical column is inserted therein and held at a center position, as indicated in FIG. 5 at step (b).

Accordingly, a space 86' having the same shape as the cathode chamber 86 (in FIG. 8) is formed between the cathode container 85 and the jig 120.

Subsequently, a funnel 121 having a designated shape, as indicated in FIG. 5 at step (c), is placed on the upper end of the jig 120, and the mixed material C is charged into the funnel 121 as indicated in the drawing so that the mixed material C is charged into the space 86' formed between the cathode container 85 and the jig 120.

After a designated amount of the mixed material C is charged into the space 86', the mixed material C is compressed by a compressing means, which is not indicated in the drawing, so that the space 86' is packed with the mixed material to a designated density. The mixed material C desirably has a volume equivalent to 5–40% of the total volume of the cathode chamber.

Then, the funnel 121 is filled with a designated amount of molten sulfur and/or sodium polysulfide D, which are main components of the cathode active material 87, as indicated in FIG. 5 at step 5 (c), so that the sulfur and/or sodium polysulfide D are charged into the space 86' and impregnated sufficiently into the mixed material C, which has been packed into the space 86'.

After solidifying the cathode active material 87 with a decrease in its temperature, the funnel 121 is detached, and the jig 120 is withdrawn from the cathode container 85. Then, a battery is assembled by inserting a solid electrolyte tube 81 having a high resistance layer 84 into the space which remains after withdrawing the jig 120, enclosing an anode active material 83, which is mainly composed of sodium metal, inside the solid electrolyte tube 81, and bonding an insulating ring 110 by thermocompression bonding.

Next, the conductive fiber ball A and conductive grain B, both of which are raw materials for the mixed material C of the cathode electric collector, will be explained hereinafter.

The conductive fiber ball A is obtained using a conductive fiber, such as a single kind of carbon fiber or a mixed carbon fiber composed of at least two kinds of a carbon fibers, selected from the group consisting of carbon fiber made from polyacrylonitrile, a carbon fiber made from coal-tar pitch, and a non-crystalline carbon fiber having a diameter in the range from 8 $\mu$m to 15 $\mu$m by cutting the carbon fiber to produce a shortened fiber tens of millimeters long (desirably 30–80 mm), and by tangling together the shortened fibers to form a fiber ball having a diameter of a few millimeters (desirably 5–15 mm) and a porosity equal to or more than 80%, in order to obtain a designated elasticity.

Granular conductive material is used as the conductive grain B. Accordingly, the conductive grain itself will hardly have any elasticity.

The conductive material is a single material or a mixture of at least two kinds of materials, selected from the group consisting of carbon made from polyacrylonitrile, carbon made from coal-tar pitch, non-crystalline carbon, natural graphite, artificial graphite, acetylene black, kitchen black, Cr—Co base alloys, and Al—Si alloys. The grain size of the conductive grain is in the range from 10 $\mu$m to 100 $\mu$m.

Next, the tensile stress loaded onto the surface of the solid electrolyte tube 81 in the sodium-sulfur secondary battery of the present embodiment was determined.

In this case, a conventional sodium-sulfur secondary battery using a felt-like carbon mat was used as a comparative example.

As a result, the tensile stress generated with the solid electrolyte tube 81 was approximately equal to or less than 1 MPa at maximum in the battery according to the embodiment of the present invention using the mixed material C for the cathode electric collector, but a tensile stress of approximately 30 MPa at maximum was confirmed with the conventional battery using the carbon group mat.

Therefore, it was revealed that, in accordance with the present embodiment, the solid electrolyte tube 81 did not have any concern as to possible breakage, and consequently, a sodium-sulfur secondary battery having no concern for possible fluctuation in internal resistance could be obtained.

Figure 6:
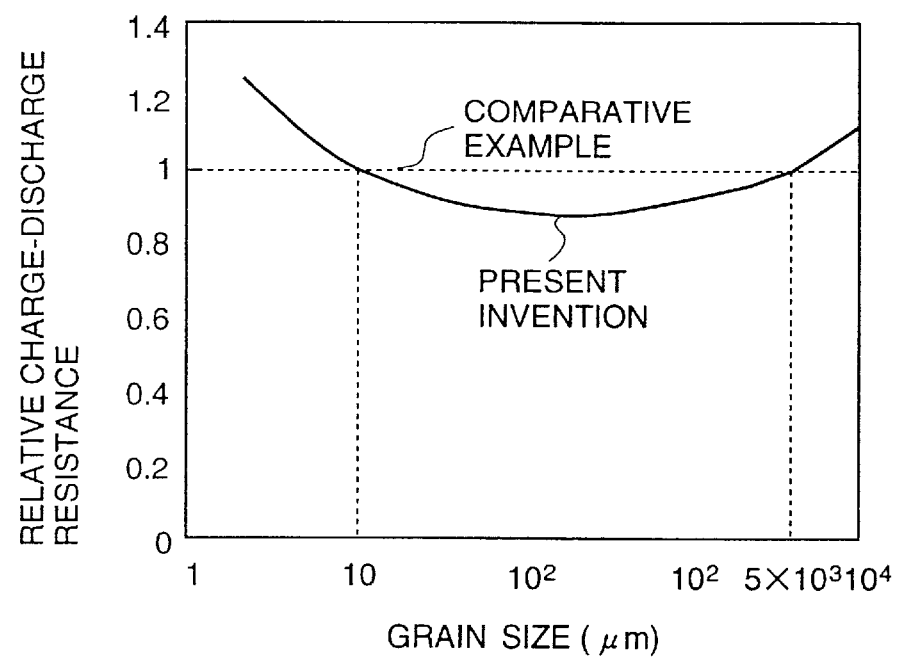
FIG. 6 is a graph indicating relative charge-discharge resistance characteristics in the embodiment of the sodium-sulfur secondary battery of the present invention.

With the sodium-sulfur secondary battery according to the present embodiment, a relationship of the grain size of the granular electric collector B contained in the mixed material C for the cathode electric collector versus the relative charging resistance of the battery is indicated by a solid line in FIG. 6.

The comparative example indicated by a dotted line in FIG. 6 concurrently represents characteristics of the conventional sodium-sulfur secondary battery using a felt-like carbon mat as the cathode electric collector.

In accordance with the embodiment of the present invention, it is revealed in FIG. 6 that the relative charge-discharge resistance can be decreased so as to be smaller than that of the conventional battery, and the desirable grain size of the conductive grain B was confirmed to be in the range from 10 $\mu$m to 5000 $\mu$m. According to the result indicated above, it has been confirmed that the present invention can be carried out using the conductive grain B having a granular size in the range from 10 $\mu$m to 5000 $\mu$m as the mixed material C for the cathode electric collector.

In accordance with the present embodiment, since the mixed material C composed of the conductive fiber ball A and the conductive grain B was used, uniform distribution of the mixed material C was obtained only by charging the mixed material into the cathode chamber 86. As a result, any concerns for disturbing the diffusion of the active material in the cathode chamber 86 are eliminated, the charge-discharge resistance can be suppressed to a low level, and an efficient charge-discharge characteristics can readily be obtained.

By using the mixed material C, the cathode electric collector is formed not as a solid body, but as an assembly of tangled fiber balls. Furthermore, since the conductive fiber ball A, which is the constituent of the cathode electric collector, has a proper elasticity, a restriction force which is generated by solidification of the cathode active material when the temperature of the battery is decreased to room temperature can be reduced, and the tensile stress generated at the surface of the solid electrolyte tube 81 is decreased.

Therefore, in accordance with the present embodiment, the possibility of breakage of the solid electrolyte tube 81 can be readily suppressed. As a result, generation of a dangerous condition caused by breakage of the battery can certainly be prevented, and a highly reliable sodium-sulfur secondary battery can readily be obtained.

Since the stress applied to the solid electrolyte tube 81 is reduced, as explained above, the wall thickness of the solid electrolyte tube 81 can be reduced. Therefore, in accordance with the present embodiment, the internal resistance of the battery is reduced, and heat generation with a high current density operation can be suppressed a low level.

Therefore, in accordance with the present embodiment, a sodium-sulfur secondary battery which is adequate for use as a module formed by connecting plural unit-batteries in series and/or in parallel is readily provided, because the heat generation can be suppressed, in addition to improving the efficiency of the battery remarkably.

If the grain size of the conductive grain B, which is another constituent of the mixed material C, is equal to or smaller than 10 $\mu$m, the diffusion of the active material becomes difficult, and the resistance of the battery is increased.

On the contrary, if the grain size exceeds 5000 $\mu$m, uniform mixing and uniform packing become difficult.

The effects of the grain size described above are indicated in the characteristics shown in FIG. 6. Accordingly, in the embodiment of the present invention, use of the conductive grain B having a grain size in the range from 10 m to 5000 $\mu$m is desirable.

(Embodiment 6)

Another embodiment of the sodium-sulfur secondary battery of the present invention will be explained hereinafter.

In accordance with the present embodiment, conductive short fibers E are used instead of the conductive grains B as one of the constituents of the mixed material C in the previous embodiment explained with reference to FIG. 5. Therefore, the cathode electric collector packed into the cathode chamber 86 is made of a mixed material C' (=A+E), which is composed of the conductive fiber ball A and the conductive short fiber E, other part of the composition is the same as the embodiment 5.

The conductive short fiber is made of any one of a single kind of carbon fiber and mixed carbon fibers composed of at least two kinds of carbon fibers selected from the group consisting of a carbon fiber made from polyacrylonitrile, a carbon fiber made from coal-tar pitch, and a non-crystalline carbon fiber, having a diameter in the range from approximately 8 $\mu$m to 15 $\mu$m, and the length of the fiber is desirably in the range of 0.01 mm–40 mm.

The conductive short fiber E is used to form the mixed material C' by being mixed with the conductive fiber ball A in a designated ratio, which material is used as the cathode electric collector.

The conductive short fiber E is not particularly indicated in the drawing.

Figure 7:
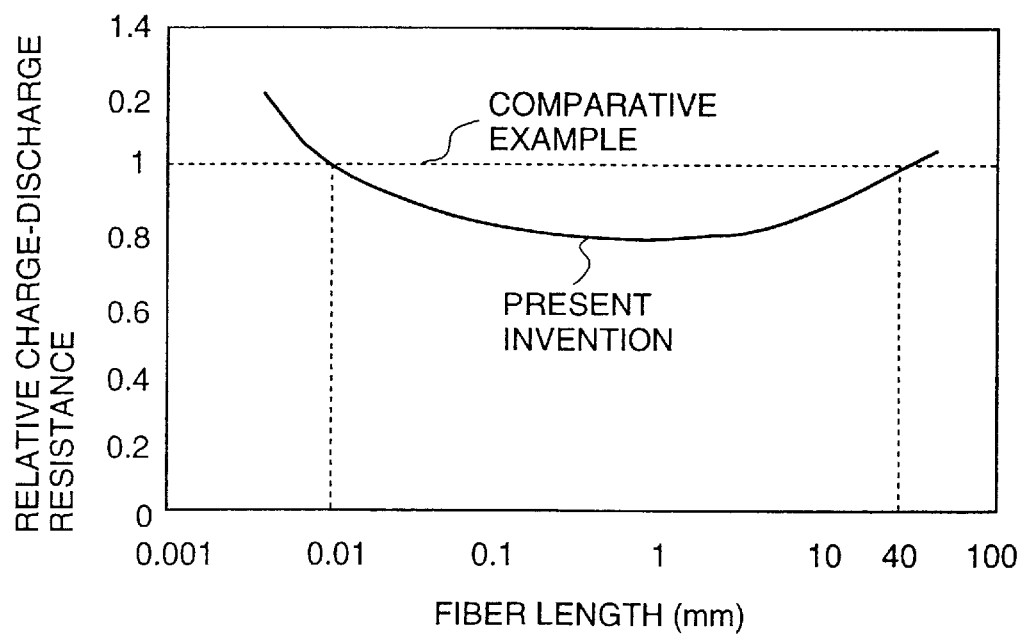
FIG. 7 is a graph indicating relative charge-discharge resistance characteristics in the embodiment of the sodium-sulfur secondary battery of the present invention.

FIG. 7 indicates with a solid line the relative charge-discharge resistance characteristics of the sodium-sulfur secondary battery according to the present embodiment, and concurrently indicates with a dotted line the characteristics of a conventional sodium-sulfur secondary battery using a felt-like carbon mat as the cathode electric collector and representing a comparative example.

In accordance with the FIG. 7, it is revealed that the relative charge-discharge resistance can be decreased by the present embodiment to be smaller than the conventional battery, and the length of the conductive short fiber E is in the range from 0.01 mm to 40 mm.

In the present embodiment, if the length of the conductive short fiber E mixed with the conductive fiber ball A is equal to or shorter than 0.01 mm, the diffusion of the cathode active material 87 is disturbed, and the charge-discharge resistance of the battery is increased.

Accordingly, the characteristics of the battery are deteriorated, if the length of the conductive short fiber E is equal to or shorter than 0.01 mm, as indicated in FIG. 7.

If the length of the conductive short fiber E exceeds 40 mm in the present embodiment, uniform mixing with the conductive fiber ball A becomes difficult, a non-uniform current distribution appears in the cathode chamber 86, and the internal resistance of the battery is increased.

Accordingly, the characteristics of the battery are deteriorated, if the length of the conductive short fiber E exceeds 40 mm as indicated in FIG. 7.

As the result, the length of the fiber of the conductive short fiber E in the present embodiment is desirably in the range of 0.01 mm–40 mm as explained above.

In accordance with the present embodiment, the mixed material C' composed of the conductive fiber ball A and the conductive short fiber E was used, and uniform distribution of the mixed material C' was obtained simply by charging the material into the cathode chamber 6 in a manner similar to the embodiment 5. As a result, any concerns for disturbing the diffusion of the active material in the cathode chamber 86 is eliminated, the charge-discharge resistance can be suppressed to a low level, and an efficient charge-discharge characteristics can readily be obtained.

By the result using the mixed material C', the cathode electric collector is formed not as a solid body, but as an assembly of tangled fiber balls. Furthermore, since the conductive fiber ball A, which is the constituent of the cathode electric collector, has a proper elasticity, a restriction force which is generated by solidification of the cathode active material when the temperature of the battery is decreased to room temperature can be reduced, and the tensile stress generated at the surface of the solid electrolyte tube 81 is decreased.

Therefore, in accordance with the present embodiment, the possibility of breakage of the solid electrolyte tube 81 can be readily suppressed. As a result, generation of a dangerous condition caused by breakage of the battery can certainly be prevented, and a highly reliable sodium-sulfur secondary battery can readily be obtained.

Since the stress applied to the solid electrolyte tube 81 is reduced, as explained above, the thickness of the solid electrolyte tube 81 can be reduced. Therefore, in accordance with the present embodiment, the internal resistance of the battery is reduced, and heat generation with a high current density operation can be suppressed to a low level.

Therefore, in accordance with the present embodiment, a sodium-sulfur secondary battery which is adequate for use as a formed module by connecting plural unit-batteries in series and/or in parallel is readily provided, because the heat generation can be suppressed, in addition to improving the efficiency of the battery remarkably.

In accordance with the embodiments of the present invention, the cathode electric collector, wherein the cathode active material is impregnated, is made of a mixed material of consisting of a conductive fiber ball and a conductive grain, or a mixed body of a conductive fiber ball and the conductive short fiber. Therefore, a distribution of the cathode electric collector in the cathode chamber becomes uniform, and concerns about possible disturbance of the cathode active material in the cathode chamber in diffusion with the charge-discharge reaction can be eliminated.

Consequently, the charge-discharge resistance is reduced, and a sodium-sulfur secondary battery having a high charge-discharge efficiency can readily be provided.

As a result, in accordance with the embodiments of the present invention, the restriction force which is generated by solidification of the cathode active material when the temperature of the battery is decreased to room temperature can be reduced, and the tensile stress generated at the surface of the solid electrolyte tube 81 is decreased. Therefore, since concerns as to possible breakage of the solid electrolyte tube are eliminated, generation of a dangerous condition caused by the breakage of the battery can certainly be prevented, and a highly reliable sodium-sulfur secondary battery can readily be provided.

Because the stress applied to the solid electrolyte tube is reduced, the thickness of the solid electrolyte tube can be reduced, and the internal resistance of the battery can be reduced. Therefore, the sodium-sulfur secondary battery, which is adequate for use as a module formed by connecting plural unit-batteries in series and/or in parallel, can readily be provided, because the heat generation in high current density operations can be suppressed, in addition to improving the efficiency of the battery remarkably.

What is claimed is:

1. A sodium-sulfur battery, comprising:
   a cathode chamber;
   cathode active materials in said cathode chamber; and
   a cathode electric collector in the cathode chamber, wherein the cathode electric collector comprises tangled conductive fiber balls made of conductive fibers of an electrically conductive material, and having a porosity of at least 80% and an elasticity.

2. The sodium-sulfur battery as claimed in claim 1, wherein the conductive fibers of the tangled conductive fiber balls have a diameter in a range of 8–15 $\mu$m and a length in a range of 30–80 mm, and each of the tangled conductive fiber balls has a diameter in a range of 5–15 mm.

3. The sodium-sulfur battery as claimed in claim 1, further comprising an anode chamber, and a solid electrolyte between the cathode chamber and anode chamber.

4. The sodium-sulfur battery as claimed in claim 3, wherein the anode chamber has sodium therein, and the cathode active materials are selected from the group consisting of sulfur and sodium polysulfide.

5. The sodium-sulfur battery as claimed in claim 4, wherein the conductive fibers of the tangled conductive fiber balls have a diameter in a range of 8–15 $\mu$m and a length in a range of 30–80 mm, and each of the tangled conductive fiber balls has a diameter in a range of 5–15 mm.

6. The sodium-sulfur battery as claimed in claim 1, wherein the cathode active materials are impregnated in the cathode electric collector.

7. The sodium-sulfur battery as claimed in claim 1, wherein the cathode electric collector occupies 5–40% of the total volume of the cathode chamber.

8. A sodium-sulfur battery as claimed in claim 1, wherein
said cathode electric collector comprises an assembly of plural tangled balls in a compressed condition.

9. A sodium-sulfur battery as claimed in claim 1, wherein
said electrically conductive material comprises a single kind of and/or a mixture of at least two kinds of fibers selected from the group consisting of a carbon fiber made from polyacrylonitrile, a carbon fiber made from coal-tar pitch, and a non-crystalline carbon fiber.

10. A sodium-sulfur battery as claimed in claim 1, wherein
said tangled conductive fiber balls of the cathode electric collector are tangled conductive fiber balls packed into the cathode chamber after being kneaded with a fused cathode active material and fabricated.

11. The sodium-sulfur battery as claimed in claim 1, wherein said tangled conductive fiber balls are balls formed by dispersing the conductive fibers of the electrically conducting material on a plate, compressing the fibers downward with another plate, and moving the plates relative to each other in order to make the tangled conductive fiber balls.

12. A sodium-sulfur battery according to claim 1, wherein
said cathode electric collector further comprises conductive grains.

13. A sodium-sulfur battery as claimed in claim 12, wherein
the diameter of said conductive grains is in the range from 10 $\mu$m to 5000 $\mu$m.

14. A sodium-sulfur battery as claimed in claim 12, wherein
the material of said conductive grains comprises any one of a single material and a mixture of at least two kinds of materials, selected from the group consisting of carbon made from polyacrylonitrile, carbon made from coal-tar pitch, non-crystalline carbon, natural graphite, artificial graphite, acetylene black, kitchen black, Cr—Co base alloys, and Al—Si alloys.

15. The sodium-sulfur battery as claimed in claim 12, wherein the conductive grains have a grain size in a range of 10 $\mu$m to 100 $\mu$m.

16. A sodium-sulfur battery as claimed in claim 1, wherein
said cathode electric collector further comprises conductive short fibers.

17. A sodium-sulfur battery as claimed in claim 16, wherein
said conductive short fiber comprise any one of a single fiber and a mixture of at least two kinds of fibers, selected from the group consisting of a carbon fiber made from polyacrylonitrile, a carbon fiber made from coal-tar pitch, and a non-crystalline carbon fiber.

18. The sodium-sulfur battery as claimed in claim 16, wherein the conductive short fibers have a diameter in a range of 8 $\mu$m to 15 $\mu$m, and a length in a range of 0.01 to 40 mm.

19. A sodium-sulfur battery which has cathode active materials and a cathode electric collector in a cathode chamber, made by a method wherein the cathode electric collector comprises tangled conductive fiber balls made of conductive fibers of an electrically conductive material, comprising the steps of:

dispersing conductive fibers, of an electrically conductive material, on a plate;

compressing the fibers downward with another plate;

moving the two plates relative to each other in order to make tangled conductive fiber balls; and packing the tangled conductive fiber balls into the cathode chamber by compressing them therein.

20. The sodium-sulfur battery as claimed in claim 19, wherein the tangled conductive fiber balls are balls made in the moving step, in which the two plates are slid or rotated relative to each other.

21. The sodium-sulfur battery as claimed in claim 19, wherein the two plates used in the moving step are flat plates.

* * * * *